United States Patent [19]
Dratt

[11] Patent Number: 5,568,791
[45] Date of Patent: Oct. 29, 1996

[54] INCUBATION METHOD AND APPARATUS THEREFOR

[76] Inventor: Rainer Dratt, Am Kolk 3,, D-39626 Bismark, Germany

[21] Appl. No.: 398,857

[22] Filed: Mar. 6, 1995

[30] Foreign Application Priority Data

Mar. 5, 1994 [DE] Germany .......................... 44 07 407.7

[51] Int. Cl.⁶ ................................................. A01K 41/06
[52] U.S. Cl. ........................................... 119/300; 119/323
[58] Field of Search ................................... 119/300, 311, 119/322, 323

[56] References Cited

U.S. PATENT DOCUMENTS

| | | | |
|---|---|---|---|
| 383,732 | 5/1888 | Hile | 119/322 X |
| 2,255,036 | 9/1941 | Gedge | 119/322 |
| 3,783,832 | 1/1974 | Marsh | 119/323 X |
| 4,546,729 | 10/1985 | Wormgoor | 119/322 X |
| 5,046,454 | 9/1991 | Jensen | 119/322 X |

*Primary Examiner*—Robert P. Swiatek
*Attorney, Agent, or Firm*—Karl Hormann

[57] ABSTRACT

A poultry egg incubation method and an apparatus for carrying out the method. Eggs are initially placed in openings of substantially egg-shaped contour provided in an egg support which is thereafter placed in a hatching bin with the eggs out of contact with the bin. The bin is then placed in an incubation container or cart. For purposes of incubation the support is lowered to place the eggs in point contact with the bin so that relative movement between bin and support causes rotation of the eggs without disturbing their position within the bin. Controlled humidifying and ventilating equipment is provided for providing stable climatic conditions.

20 Claims, 6 Drawing Sheets

INCUBATION METHOD AND APPARATUS THEREFOR

BACKGROUND OF THE INVENTION

1. Field of the Invention

The invention, in general, relates to a novel incubation method and apparatus therefor and, more particularly, to a method and apparatus of the kind useful in poultry hatcheries for storing and moving eggs for their incubation and subsequent hatching.

2. Statement of the Prior Art

It is common knowledge that for purposes of incubation, eggs are placed on support racks or bins prior to insertion into storage racks or carts. The necessary rotating and turning of the eggs is done by rotating or tilting of the racks within their racks or carts.

A plurality of apparatus have hitherto been proposed with a view to rendering the incubation process as effective as possible.

For example, German Utility Model G 8,617,367.7 discloses an apparatus for turning eggs in a rolling manner and comprising a frame and a support surface which is pervious to a gaseous medium. Within the frame there are provided rounded rotatably mounted shafts spaced from each other at distances corresponding to the size of eggs. By sliding the frame on the pervious surface, the shafts and, hence, the eggs are caused to rotate. The shafts are removed before the eggs are hatched, to provide more space and a planar support surface for the hatched chicks.

The rotary turning apparatus as well as racks or bins operating on the principle of rotary turning and allowing for a practically unlimited angle of rotation are known from their use in small incubation apparatus. However, the known systems suffer from the following disadvantages which inhibit their utilization in large scale incubators.

The round shafts have to be removed from the racks before the chicks hatch.

Furthermore, the smooth shafts used in such apparatus do not provide a definite space for each egg. Proper ventilation of the stack of eggs is inhibited by the supports used for the rotary racks.

Reference is furthermore made to (east) German Patent DD-PS 295,967 which relates to an incubation rack for automatically incubating eggs and in which the eggs, within the incubation rack, are stored or deposited on round shafts provided with rolling elements.

While in such apparatus the location of the eggs is stabilized, i.e. defined, the apparatus suffers from the disadvantage that prior to hatching the eggs must either be removed to a hatching bin or rack, or the roller bin must be placed over a hatching bin. In any event, some kind of handling is required between the incubation and the hatching bins.

Another known system, marketed by a Danish company (Funki), provides for placing eggs into a hatching bin by means of a mesh frame insertable therein. For hatching, the frame is removed. The hatching bins including incubating eggs and mesh frame are rotated or turned in a conventional incubation cart.

This method or system is disadvantageous because of its reduced egg holding capacity as compared to conventional incubation bins and because of the necessary removal of the mesh frame and the changing of the bins onto a hatching cart.

OBJECTS OF THE INVENTION

It is a general object of the invention to provide for an apparatus in which transport, storage, incubation and hatching of eggs is accomplished independently of external influences and in a continuous operation.

A further object of the invention resides in the provision of an incubation which resembles as closely as possible the conditions of a natural nest.

Yet another object of the invention is to provide for an enhanced incubation effectiveness.

It is also an object of the invention to reduce the technical and manual operations of conventional methods and equipment.

SUMMARY OF THE INVENTION

In accordance with a preferred method, eggs are placed on a support frame and then inserted, stored, transported and incubated in a hatching bin. During storage and transport, the eggs are spaced from the bottom surface of their hatching bins and are peripherally supported therein. During incubation, the eggs are placed on the bottom surface in tangential or point contact therewith and in an inclination toward their tips, and they are turned by an angle of >90° by apparatus provided at the exterior of the incubation equipment. Initial incubation is terminated by ceasing to rotate the eggs and the eggs are allowed to hatch without being further moved. Incubation takes place continuously within an incubator.

In a preferred embodiment of the apparatus in accordance with the invention a stacking frame provided with insertable hatching bins which in turn are provided with egg supports is arranged within an incubation container. Preferably, the stacking frame is movably connected to a controllable drive. The connection between the drive and the frame may include a crank mechanism. The hatching bins within the stacking frame are spaced from each other as well as from the inner wall of the incubation container with an additional elongate air duct being provided in the center of the container. Ventilating and humidifying means may be provided beneath the container.

Advantageously, the drive control is removably mounted on exterior wall of the incubation container, and the egg supports are provided with abutments extending through the hatching bins for the support thereof at an exterior wall of the container.

In another advantageous embodiment, the egg supports are provided with openings corresponding to the shape, but being slightly smaller than, the longitudinal dimension of the eggs, and with support struts.

The hatching bins are preferably provided with support elements allowing the egg supports to be spaced from the bottom of the hatching bin or to be in contact therewith.

Preferably, the ventilating and humidifying apparatus comprises a water pan and a humidifying chamber positioned over the water pan with a pipe penetrating into the water pan through central openings provided in upper and lower covers of the water pan. A centrifugal disk may be provided on the pipe for radially dispensing water.

The pipe is preferably rotatably driven by an electric motor mounted in the incubation container, and may be provided with an aerator and air vanes.

In a further advantageous embodiment, a helically formed element may be provided in the interior pipe and extend axially therein, and lateral ventilation slots may be provided in the upper cover of the water pan.

Other objects and advantages of the invention will in part be obvious and will in part appear hereinafter.

DESCRIPTION OF THE SEVERAL DRAWINGS

The novel features which are considered to be characteristic of the invention are set forth with particularity in the appended claims. The invention itself, however, in respect of its steps, the sequence of operation as well as the arrangement and construction of the parts constituting its preferred physical embodiments, together with other advantages and objects thereof, will be best understood from the following description when read in connection with the appended drawings, in which:

DETAILED DESCRIPTION OF THE INVENTION

Eggs 1 to be incubated pursuant to the method proposed by the instant invention are deposited on a specially configured egg support 2 of substantially rectangular configuration and which is provided with openings 3 for receiving eggs 1 therein. The openings 3 are configured to accommodate the shape of the eggs 1, i.e. they have the same contour as, but are slightly smaller than, an egg in its longitudinal dimension. Thus, the eggs 1 can be securely retained within the openings 3 by engagement with the margins thereof. The eggs 1 are stored and transported in this arrangement.

Preferably the egg support 2 is made from a fairly rigid, i.e. inflexible plastic material, such as polyethylene, and is shaped to accommodate stacking. For this purpose, the egg supports 2 are provided with struts 4 which are preferably placed at the four corners on one surface of each support 2. Additionally, abutments 5 are provided at the lateral margins of the supports 2 to be accessible for engagement by means utilized to impart lateral sliding movement to said supports.

Figure 1:
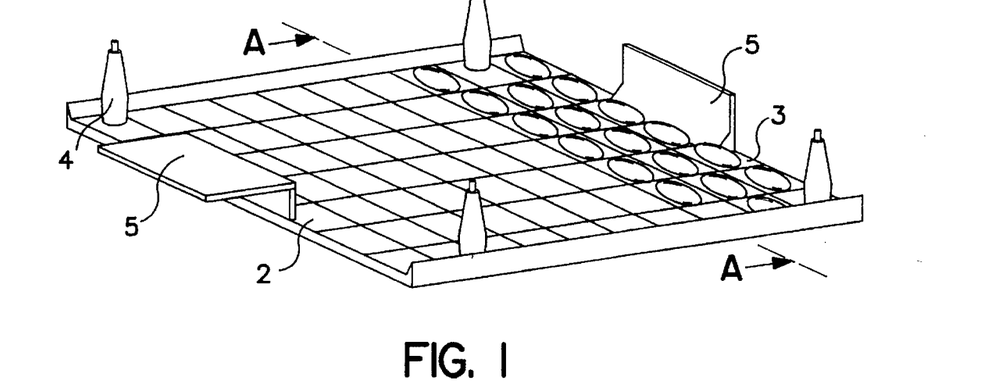
FIG. 1 is a schematic perspective view of an egg support in accordance with the invention.
Figure 2:
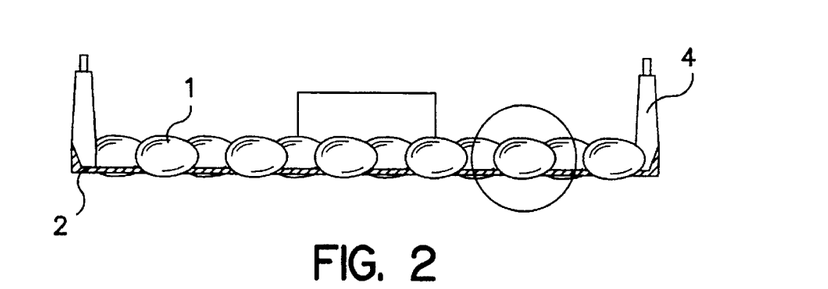
FIG. 2 is a sectional view along line A—A of FIG. 1.
Figure 3:
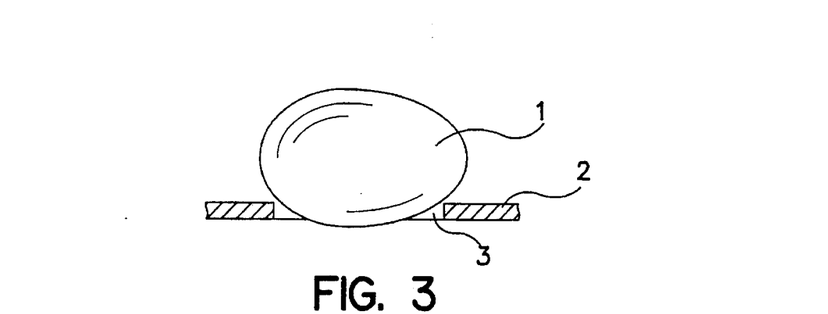
FIG. 3 is an enlarged partial view of a portion of FIG. 2, with the egg support in an elevated position.

The physical embodiment of the egg support 2 is shown in FIG. 1; the manner of depositing and retaining eggs 1 in the support 2 is shown in FIG. 2. FIG. 3 depicts, in an enlarged scale, the precise position of an egg 1, depicting it in its loading position to protrude through the support by about 2 to 5 mm.

Figure 4:
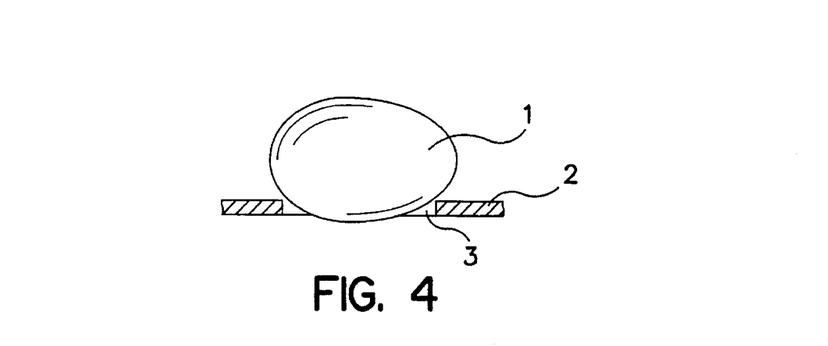
FIG. 4 is a view corresponding to FIG. 3, with the egg support in its lowered position.

In its lowered condition, the egg support 2 engages the bottom 7 of a hatching bin 6 thus releasing the eggs 1 stored within it, as will subsequently be described in greater detail. In this condition, the egg 1 engages the bottom 7 in a peripheral, i.e. point-like manner; it is released from its peripheral engagement with the margin of its opening and assumes its natural disposition at an inclination toward its tip, as shown in FIG. 4.

Egg supports 2 of the kind shown in FIG. 1 are suitable for being directly stacked and inserted in hatching bins 6 which can also be stacked but which need no special receptacles for the egg supports 2. The egg supports 2 are deposited directly on the bottom 7 of the hatching bin 6, and the eggs 1 will then be in their position described in connection with FIG. 4.

Figure 5:
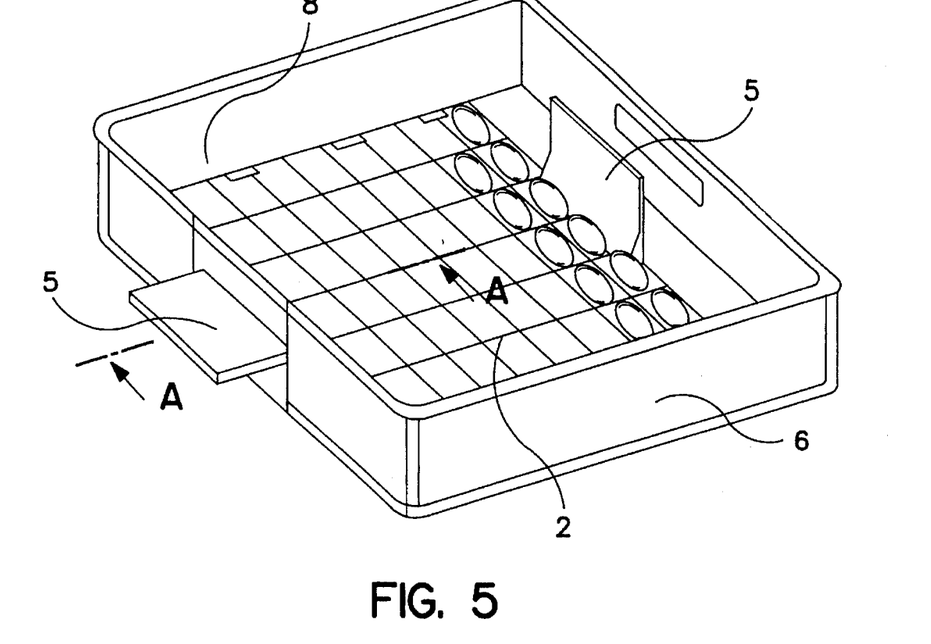
FIG. 5 is a schematic perspective view of a hatching bin with an egg support inserted therein.

FIG. 5 depicts an alternate embodiment of an egg support 2 and a hatching bin 6 inserted therein.

Figure 6:
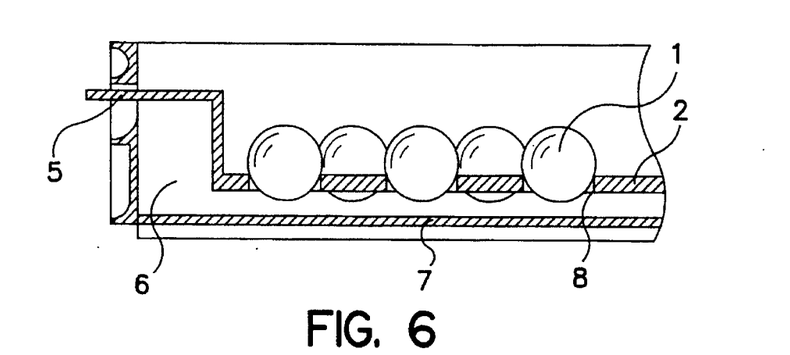
FIG. 6 is a sectional view along line A—A of FIG. 5.

The egg support 2 rests on corresponding brackets 8 provided at the longitudinal sides of the hatching bin 6. When an egg support 2 is positioned on such brackets 8, eggs deposited in it may be securely transported and stored without shifting or moving. This position is shown in FIG. 6.

Figure 7:
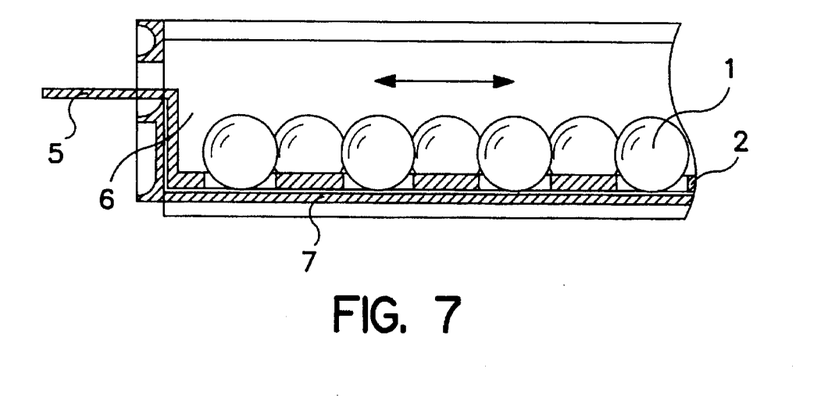
FIG. 7 is a partial sectional view corresponding to FIG. 6, with the egg support in its lowered position.

By removing the brackets 8, or by shifting the egg supports 2 on the brackets 8, the egg supports 2 are lowered to the bottom 7 of the hatching bin 6 so that the eggs 1 will be in their incubation and turning disposition shown in FIG. 7.

Any succeeding movement serves to move and turn the eggs 1. When the hatching phase has been reached the eggs 1 will not be moved any more so that any chick inside the egg 1 need not adjust its own position, which in turn has a positive effect on its incubation.

Turning movement of the eggs 1 is initiated by alternating actuation of brackets 5 pursuant to a predetermined sequence. Alternatively, the egg supports 2 may be stationary while the hatching bin 6 is moved. In any case, the hatching bin 6 is configured to ensure proper air perviousness for ventilation, the hatching bins 6 being provided with an enclosed or a perforated bottom surface 7.

It will be appreciated by those skilled in the art that eggs 1 may be deposited on the egg supports 1 directly in the incubation facility. Where egg supports 2 are utilized which are provided with struts 4, they may be stacked, transported and stored and inserted in suitable hatching bins 6 in an incubation plant.

In the alternative embodiment of egg supports 2 the egg supports 2 eggs 1 are deposited on the egg supports 2 with the hatching bins 6 in their transport or storage position, and the egg supports 2 are then stacked. In this manner, they can either be placed on a transporter, or they may be directly stacked onto an incubation cart.

Incubation of the eggs 1 may take place in an incubation container, a bin cart inserted into a conventional incubator, or in an incubation cart.

Figure 8:
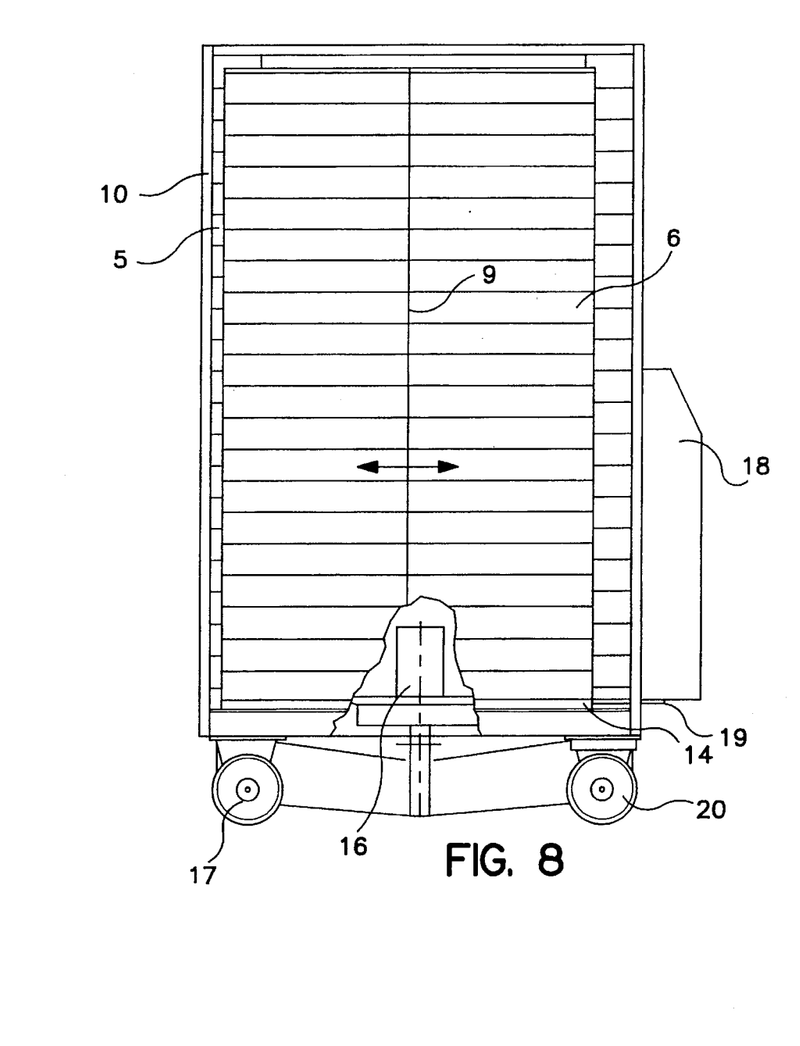
FIG. 8 is a schematic side view, partially in section, of an incubating container in accordance with the invention.
Figure 9:
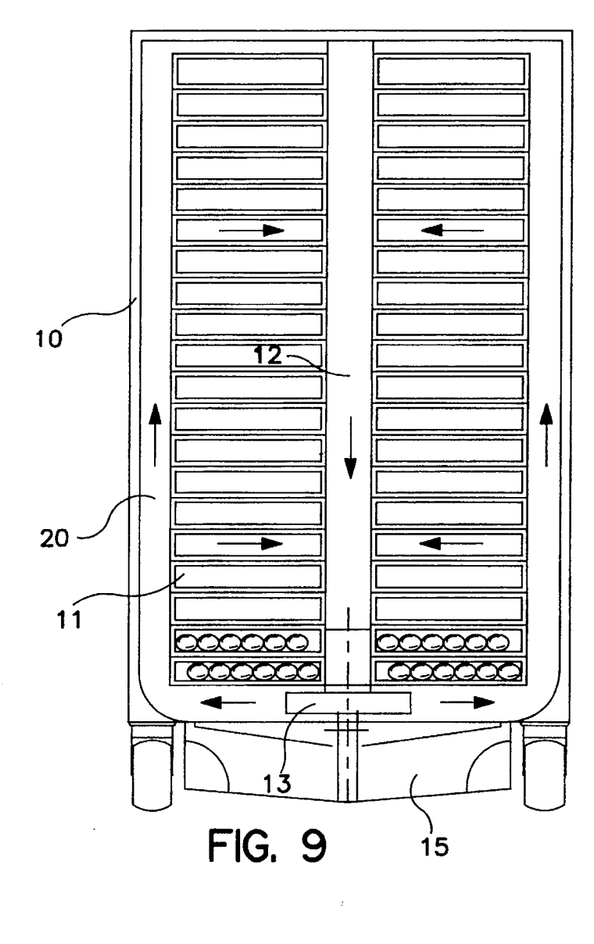
FIG. 9 is a schematic front view of the container of FIG. 8.

As shown in FIGS. 8 and 9, an incubation container 9 is a complete unit in which all components or modules required for artificial incubation are united.

The incubation container 9 is an enclosed container with insulated outer walls 10 and a movable stacking frame 14 for receiving hatching bins 6.

Beneath the stacking frame 14 there is provided an exchangeable water pan 15 including a ventilator 13, and a control apparatus 18 is removably mounted on an exterior wall 10. As will be appreciated by persons skilled in the art, the control apparatus 18 is of the kind suitable to provide motion to the bins 6 and/or egg supports 2 at predeterminable intervals. It may be a manually actuable open loop control or a closed loop control provided with appropriate sensors (not shown) responding to ambient conditions within the container for fully automatic control thereof. The container 9 is mounted on wheels 17 for easy transportability.

The hatching bins 6 including the egg supports 2 provided therein are stacked in superposed relationship within the container 9 and supported within the horizontally moveable stacking frame 14 in such a manner that sufficient free space remains to form a vertical elongate air duct 12 for circulating air horizontally through perforations 11 in the hatching bins 6.

Another free space 20 is provided between the stacked hatching bins 6 and the insulating outer side and front walls 10.

The egg supports 2 are supported at the front walls of the container 9 by way of their abutments 5.

Rotating or moving the eggs 1 is accomplished by a reversing drive connected to the movable stacking frame 14 by means of a crank drive 19 for imparting horizontal sliding motion to the hatching bins 6. Rotating takes place in the manner described supra, under the control of the control apparatus 18.

Figure 10:
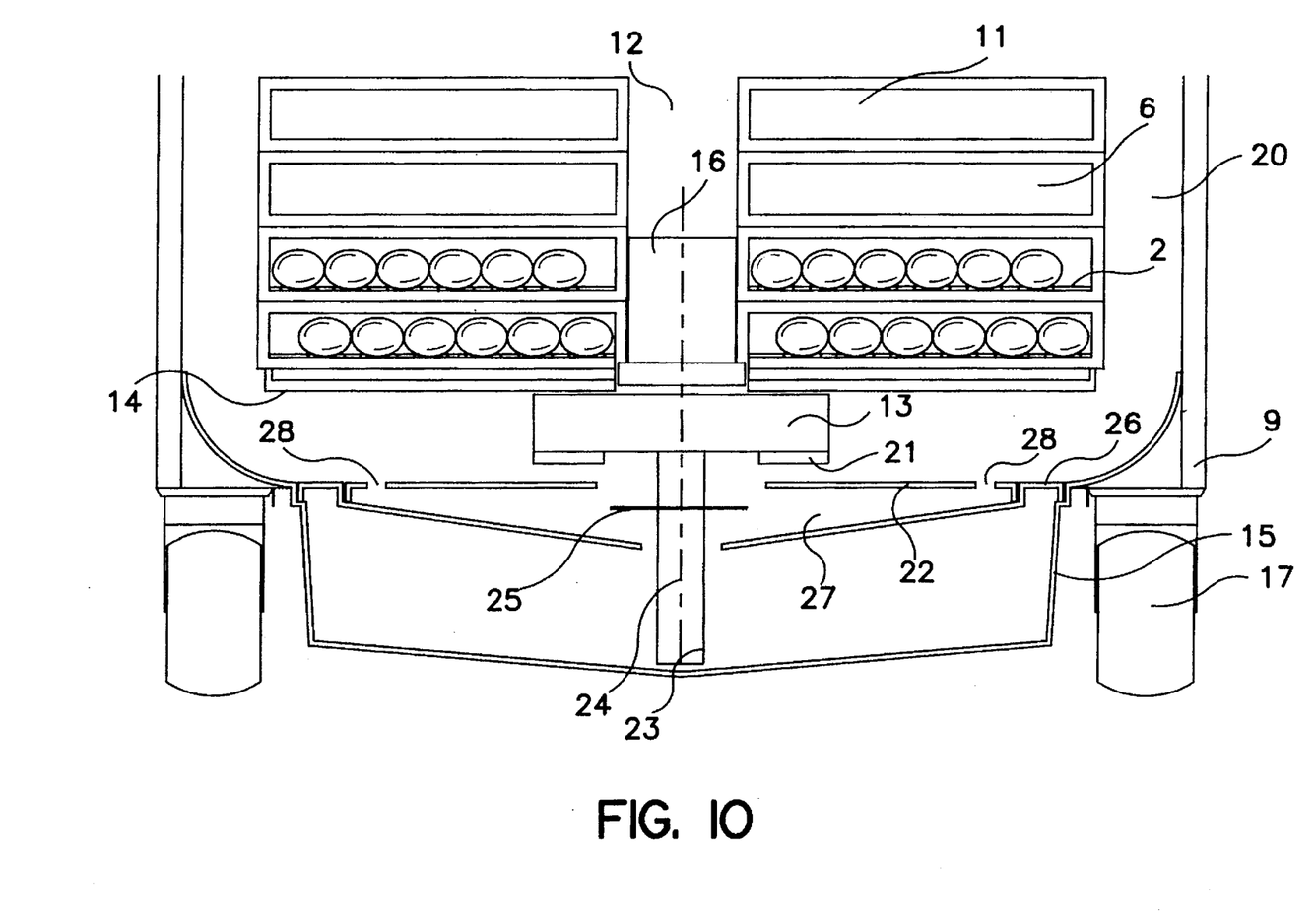
FIG. 10 is an enlarged partial view of the container of FIG. 9.

The ventilation and humidifying unit configured and arranged in accordance with the invention is shown in FIG. 10. It comprises a bidirectionally driveable electric motor 16 and a ventilation wheel 13 configured as a radial fan, as well as air blades 21 arranged at the lower surface of the fan 13. A pipe 23 is directly connected to the drive shaft of the motor 16 or as an axial extension of the fan 13 and is provided in its interior with an axially extending helically configured fluid pumping element 24.

The pipe 23 extends to below the surface of the water within the pan 15 and is provided with a centrifugal plate 25 positioned over the water surface.

A humidifying chamber is provided between cover plates 22 and 26. The cover plates 22, 26 are each provided with central openings, and the upper cover plate 22 is additionally provided with lateral ventilation slots 28. The upper cover plate 22 is planar and disposed substantially horizontally; the lower cover plate 26 is preferably symmetrically inclined toward the axis of the pipe 23 to provide a drain surface for excess or condensate water.

The cover plates 22, 26 constitute barriers for the humidifying chamber as well as for the water pan. They prevent excessive or undesired surface evaporation of the water as well as drop formation inside the incubation chamber of the incubation container 9.

The ventilation and humidifying unit shown in FIG. 10 is configured so that air is extracted from the central air duct 12 across the upper surface of the fan wheel 13 facing the electric motor 16 and is horizontally dispersed to the outside below the hatching bins 6.

The fan blades at the lower surface of the fan wheel 13 provide a secondary air current flowing through the humidifying chamber 27 and the lateral ventilation slots 28 into the incubation container 9.

Depending upon the rotational direction, the helical element 24 seated within the pipe 23 either pumps water upwardly from the water pan 15 into the humidifying chamber 27 or pushes excess water from the pipe 23 into the water pan 15.

The water fed upwardly is conveyed through the opening of the lower cover plate 26 to the centrifugal disc 25 and is sprayed into the humidifying chamber 27. Excess water is returned to the water pan 15 by way of the inclined surface of the lower cover plate 26.

The upper air blades 21 provide for suction of air from the incubation chamber through the central opening of the upper cover plate 22 and the humidifying chamber 27 with the water spray direction being opposing the air flow.

The highly humidified air exiting at the underside of the fan 13 mixed homogeneously with ambient air coming from the upper surface of the fan wheel 13.

By appropriately controlling the fan 13 by means of the control apparatus 19 in response to the conditions prevailing within the container 9 and other requirements leading to optimum incubation conditions, the humidity within the incubation chamber 9 may be controlled.

The air flow path is established within the incubation container 9 whenever air coming from the fan 13 flows through the free spaces 20 and through the hatching bins 6 into the duct 12.

The cycle may be controlled by means of the control apparatus 18 which is connected to temperature and humidity sensors (not shown) and provided with controls responding to signals derived therefrom by providing appropriate adjustments, thereby monitoring and controlling the incubation process. Also provided within the control apparatus 18 (but not shown) are controls for the rotating drive, for fresh air supply and/or air conditioning.

In addition to the advantages relating to depositing and rotation of eggs described, the following advantages may be derived from the container:

The eggs are present in the same chamber beginning with their deposit and insertion in the container up to the removal of hatched chicks.

Unlike conditions in large scale incubators, the spreading of germs is effectively prevented because of the relatively small number of eggs in each container.

The "all in—all out" operating principle is realizable more effectively.

The use of closed bottom hatching bins prevents the escape of fluid from eggs broken in upper bins.

The incubation containers may be placed into an incubation facility from the time incubation commences until hatching, or after incubation they may be transported to hatching facilities, without any need for opening the container.

Residue from the eggs remains within the container and does not soil the hatching facility.

Service and labor are reduced by a significant factor.

Figure 11:
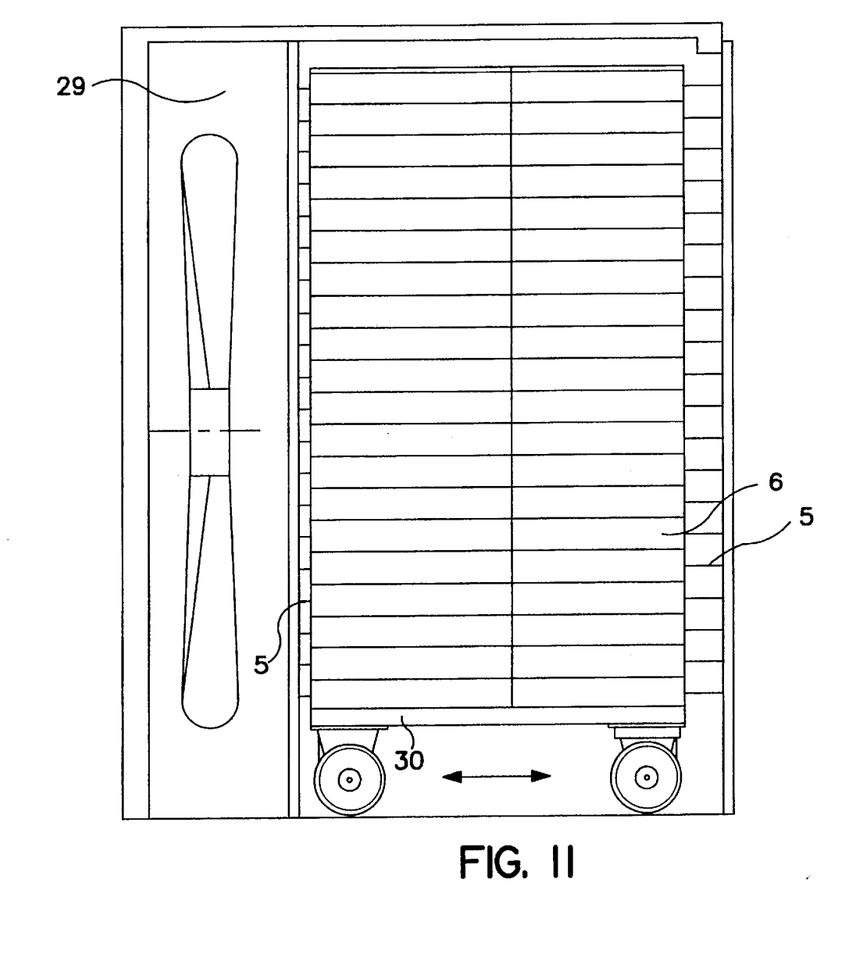
FIG. 11 is a schematic side view of a bin cart in an incubator housing.
Figure 12:
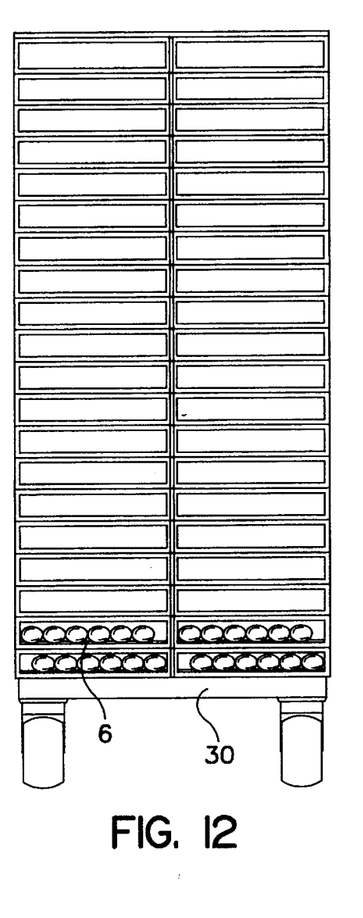
FIG. 12 is a front view of the container of FIG. 11.

The arrangement of hatching bins 6 in conventional incubators is depicted in FIGS. 11 and 12. As shown, the hatching bins 6 are inserted within a special bin cart 30, and the cart is placed into an incubation aggregate 29.

The bin or rack carts 30 are stored within the incubation aggregates 29 in a manner in which the hatching bins 6 are supported by the exterior walls, and rotating the eggs is accomplished by laterally moving the wheel-mounted rack carts 30.

Figure 13:
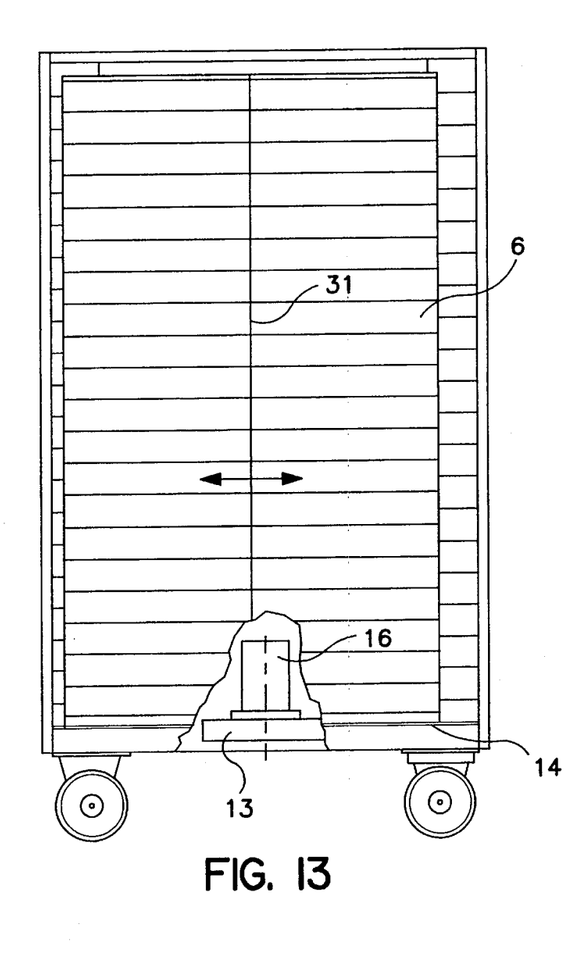
FIG. 13 is a side view, partially in section, of a bin cart.
Figure 14:
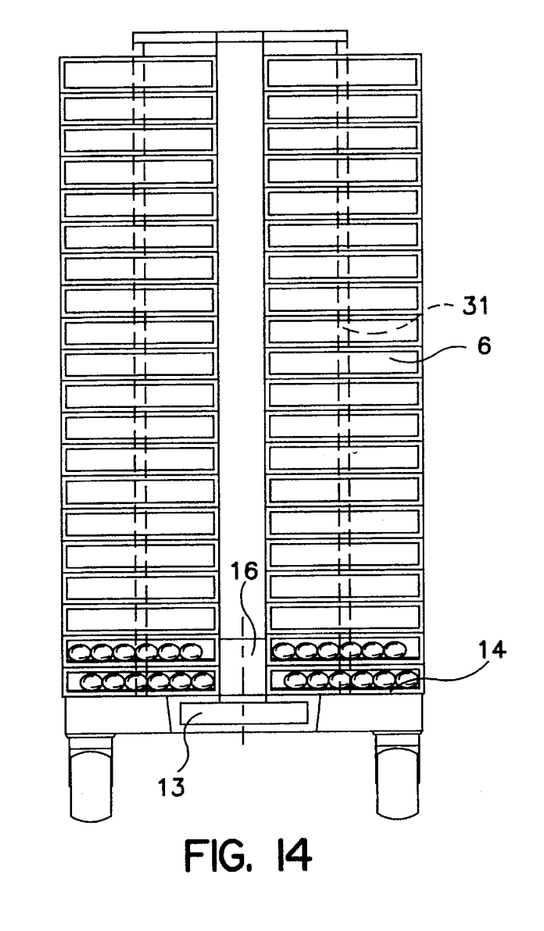
FIG. 14 is a front view of the cart of FIG. 13.

It is also possible to utilize an incubation cart 31 in large incubation facilities, air-conditioned (climatized) rooms in hatcheries, the incubation cart 31 being provided with an elongate air duct 12. Ventilation of incubating eggs is carried out by way of a radial fan 13 positioned below the stacking frame. Such embodiments are depicted in FIGS. 13 and 14.

As will be appreciated by those skilled in the art of poultry incubation, the method in accordance with the present invention is advantageous in that it allows eggs to be placed into an egg support and to remain therein for transporting, storing, and incubating without any further handling in the incubation container or facility until the chicks have hatched and need to be removed.

The generally necessary rotating of the eggs is carried out by the equipment provided in accordance with the invention from the outside without touching, simply by shifting or sliding the egg support. This is accomplished by lowering the egg support onto the bottom surface of the hatching bin during incubation to provide a peripheral or point-like contact therewith while on its sides the egg remains out of contact with its holder. But because of the egg-shaped openings in the holder the eggs nevertheless remain in their defined positions and are secured against unintentional rotation and escape.

Rotation of the eggs takes place by the egg holders being moved from the outside to cause the eggs to roll transversely of their longitudinal axis.

The possible angle of rotation is >90° and yields superior incubation results. The results are further improved by the eggs being disposed at an inclination toward their tip which in turn provides for an optimum disposition of the air bubble and of the embryo.

It is an essential aspect of the method in accordance of the invention that the egg supports loaded with eggs during transport and storage are placed into the hatching bins in a manner ensuring a predetermined space between the eggs and the bottom of the bin thus causing the eggs firmly to be placed in their openings within the support.

During incubation and hatching the egg supports are lying on the bottom of the hatching bin thus causing the eggs slightly to be lifted out of their openings or receptacles and to be put into peripheral or point-like contact with the bottom of the bin. At the same time they are kept in their assigned positions by their respective receptacles.

The method may be practiced in apparatus constituting compact and enclosed incubation containers or open bin carts for use in conventional incubation facilities equipped with appropriate technical components. Alternatively, it may be practiced in bin carts equipped with ventilators and humidifiers as well as with a rotating drives which for purposes of incubation are placed in climatized rooms.

It is believed to be obvious to persons skilled in the art that certain changes and alterations may be made in the embodiments described supra without departing from the scope of the invention. It is, therefore, intended that all matter herein disclosed be interpreted as illustrative only and not as limiting the scope of protection sought.

What is claimed is:

1. A method of incubating poultry eggs of any kind, comprising the steps of:
   depositing a plurality of eggs in openings of substantially egg-shaped contour provided in egg support means with said eggs protruding slightly through said openings and being in peripheral contact with the margins thereof;
   securing said egg support means in hatching bin means provided with bottom surface means such that said eggs are spaced from said bottom surface means by a predetermined distance;
   moving said egg support means toward said bottom surface means to free said eggs from their peripheral contact with said margins and to cause peripheral point contact between said eggs and said bottom surface means;
   subjecting said eggs to an incubation process;
   periodically imparting rotary movement to said eggs;
   terminating said incubation process by ceasing said rotary movement and causing said eggs to hatch without removal from said bin means.

2. The method of claim 1, further including the step of placing said bin means in container means.

3. The method of claim 1, wherein said eggs when contacting said bottom surface means are inclined toward their tip.

4. The method of claim 1, wherein said eggs are rotated by moving said bin means.

5. The method of claim 4, wherein said eggs are rotated by an angle of >90°.

6. An apparatus for incubating eggs in accordance with the method of claim 1, comprising:
   egg support means provided with openings of substantially egg-shaped contour;
   a plurality of hatching bin means comprising bottom surface means, for selectively retaining said egg support means in a first position in which said egg support means are spaced out of contact with said bottom surface means and a second position in which said egg support means engages said bottom surface means;
   incubation container means comprising wall means, for receiving a plurality of said hatching bin means in stacked superposed relationship;
   air duct means intermediate said stacked bin means and said outer wall means; and
   ventilating and humidifying means mounted beneath said container means and connected to said air duct means.

7. The apparatus of claim 6, wherein said hatching bin means are stacked in substantially parallel relationship forming a substantially vertical air duct therebetween.

8. The apparatus of claim 7, wherein said ventilating and humidifying means is connected to said vertical air duct means.

9. The apparatus of claim 8, wherein said humidifying means comprises water pan means positioned beneath said incubation container means and humidifying chamber means between said container and said water pan.

10. The apparatus of claim 9, further comprising cover plate means intermediate said humidifying chamber means and said water pan means.

11. The apparatus of claim 10, wherein said cover plate means comprises a first cover plate having a central opening therein in substantial alignment with said vertical duct means and being mounted in a substantially horizontal orientation.

12. The apparatus of claim 11, further comprising a second cover plate having a central opening in alignment with said vertical duct means, said second cover plate being disposed beneath said first cover plate to form a lateral slot therewith and being downwardly inclined toward said central opening.

13. The apparatus of claim 11, wherein said humidifying means further comprises pipe means extending vertically into said water pan means and having a helically configured axially disposed fluid pumping member provided in its interior.

14. The apparatus of claim 13, further comprising bidirectionally driveable electric motor means operatively connected to said pipe means.

15. The apparatus of claim 14, wherein said pipe means is provided with ventilating fan means and radially extending centrifugal disk means.

16. The apparatus of claim 6, wherein said egg support means are provided with laterally extending abutment means.

17. The apparatus of claim 16, wherein said abutment means extend through said hatching bin means for support by said wall means.

18. The apparatus of claim 6, wherein said openings are slightly smaller than eggs in their longitudinal dimension.

19. The apparatus of claim 6, wherein said hatching bin means comprises bracket means for selectively retaining said egg support means in its first and second positions.

20. The apparatus of claim 6, further comprising control means for selectively moving said egg support means relative to said hatching bin means and for controlling said ventilation and humidifying means.

* * * * *